United States Patent
Kurahashi et al.

[11] Patent Number: 6,059,197
[45] Date of Patent: May 9, 2000

[54] AUTOMOTIVE AIR-CONDITIONER HAVING HOT-WATER HEATING SYSTEM

[75] Inventors: Yasufumi Kurahashi, Otsu; Minoru Fukumoto, Nara, both of Japan

[73] Assignee: Matsushita Electric Industrial Co., Ltd., Osaka-fu, Japan

[21] Appl. No.: 09/145,639

[22] Filed: Sep. 2, 1998

[51] Int. Cl.$^7$ ..................................................... B60H 1/02
[52] U.S. Cl. ................................ 237/12.3 R; 237/12.3 B; 123/142.5 E
[58] Field of Search .................. 237/12.3 B, 12.3 R; 165/42; 123/142.5 E

[56] References Cited

U.S. PATENT DOCUMENTS

| | | | |
|---|---|---|---|
| 4,611,466 | 9/1986 | Keedy | 60/714 |
| 5,325,912 | 7/1994 | Hotta | 165/42 |
| 5,330,385 | 7/1994 | Hotta | 165/42 |

*Primary Examiner*—Harold Joyce
*Assistant Examiner*—Derek S. Boles
*Attorney, Agent, or Firm*—Wenderoth, Lind & Ponack, L.L.P.

[57] ABSTRACT

An air-conditioner has a hot-water heating system 110. The system includes a switch 140 for setting a temperature in an interior, a sensor 134 for sensing a temperature of water, a first relay 116 for controlling the water temperature, and a second relay 118 for preventing an overheating. A controller 130 is provided which controls the first relay to adjust the water temperature to a certain temperature based on the set temperature and the detected temperature. When the water temperature has increased to a predetermined temperature, the controller controls the second relay to disconnect between a heater 114 and a power source 120.

8 Claims, 7 Drawing Sheets

AUTOMOTIVE AIR-CONDITIONER HAVING HOT-WATER HEATING SYSTEM

The present invention relates to an air-conditioner having a hot-water heating system for controlling a temperature in an interior of an automobile. Also, the present invention relates to an air-conditioner preferably for use in an electric car and a so-called hybrid car.

BACKGROUND OF THE INVENTION

A typical automotive air-conditioner for controlling a temperature in an interior has a hot-water heating system. The system includes a closed circuit in which a heat transporting medium or water is circulated. During circulation, heat is provided to the water and then transmitted to air to be fed into the interior.

Referring to FIG. 7, there is shown a schematic block diagram of the prior art hot-water heating system, generally indicated by reference numeral 10, of the automotive air-conditioner. The hot-water heating system 10 has a closed passage 12 for circulating a heating medium or water W. The passage 12 includes a heater unit 14 for heating the water W, a circulation pump 16 for circulating the water W in the closed passage 12, a heat exchanger 18 for exchanging heat between the heated water W and air to be fed into the interior.

The heater unit 14 is equipped with an electric heater 20. The heater 20 is connected through a switching means or relay 22 for controlling a supply of an electric power to the heater 20 and then a fuse 24 designed to blow when it is heated up to a certain high temperature with a DC power source 26. The relay 22 includes a contact 28 that takes a first position in which it permits the heater 20 to be energized and a second position in which it prohibits the heater 20 to be energized and a coil 30 for moving the contact 28 between the first and second positions. The coil 30 is connected with a controller 32 which is in turn connected with a temperature sensor 34 for sensing a temperature of the heated water W in the circuit and a plurality of inputs mounted on an operation panel 36 in the interior. The inputs, among others, include a switch 38 for turning on and off the air-conditioner and a switch 40 or volume for setting an air-conditioning temperature of an ambient in the interior to be air-conditioned. Further, the coil 30 is connected with another DC power source 42.

In operation of the automotive air-conditioner, the water W is circulated in the passage 12 in the direction indicated by arrows by the circulation pump 16. In the circulation, the water W is heated at the heater 20. The heated water W is then fed into the heat exchanger 18 where heat of the water W is transmitted to air to be fed into the interior.

The temperature of the heated water W is controlled based on a comparison of between the air-conditioning temperature set by the switch 40 and the water temperature detected at the temperature sensor 34. For example, the controller 32 controls the relay 22 to turn on and off the electric power from the DC power supply 26 to the heater 20.

According to the air-conditioner with the hot-water heating system, once a contact 28 of the relay 22 is fused to lead a short-circuit of the circuit, the heater 20 is out of control, resulting in an overheating of the heater 20. At worst, the overheating, unless eliminated, would provide serious problems, such as breakdown of the heater 20. To prevent this, the system 10 is designed so that the fuse 24 detects the overheating and then disconnects the circuit.

Normally, because the hot-water heating system is positioned out of the interior and, therefore, subject to water or rain, the fuse 24 should be waterproofed. Disadvantageously, this results in a bulky and costly fuse unit. Also, the ambient temperature provides an adverse affect to the fuse 24, leading a great difficulty in a design of the fuse capable of working precisely.

Therefore, there has been a need for a technique capable of switching off the heating system of the air-conditioner without using any fuse to prevent the overheating when the relay is broken down.

SUMMARY OF THE INVENTION

Among the several objects and features of the present invention may be noted the provision of an automotive air-conditioner, preferably used in an electric car and a so-called hybrid car, having a hot-water heating system that includes a heater, a power source, and a switching means for controlling a supply of an electric power from the power supply to the heater, in which, if the switching means falls into a malfunction state, the heater is safely and reliably disconnected with the power source and, thereby, preventing an overheating of the heater.

Accordingly, an automotive air-conditioner having a hot-water heating system comprises
(a) means for setting an air-conditioning temperature;
(b) means for detecting a temperature of the heated water;
(c) a power supply for supplying an electric power to said heating means;
(d) a first switching means for controlling an electric supply from the power supply Lo the heating means;
(e) a second switching means associated with said first means for controlling the electric supply from the power supply to the heating means.
(f) a controller designed so as to control the first switching means in response to the set temperature and the detected temperature to adjust the temperature of the water to a certain control temperature determined by the set temperature, and to discontinue the electric supply to the heater by switching off the second switching means when the water temperature is greater than a reference temperature.

In another embodiment of the present invention, an automotive air-conditioner having a hot-water heating system comprises
(a) means for setting an air-conditioning temperature;
(b) means for detecting a temperature of the heated water;
(c) a power supply for supplying an electric power to said heating means;
(d) a first switching means for controlling an electric supply from the power supply to the heating means;
(e) a second switching means for controlling the electric supply from the power supply to the heating means;
(f) a controller designed so as to control the first switching means and the second switching means in response to the set temperature and the detected temperature to adjust the temperature of the water to a certain control temperature determined by the set temperature, and to discontinue the electric supply to the heater by switching off the first and second switching means when the water temperature is greater than a reference temperature.

In another aspect of the present invention, the reference temperature is greater by a predetermined temperature than the certain control temperature.

In another aspect of the present invention, the apparatus further includes means for warning if the first or second switching means is in a malfunction state.

In another aspect of the present invention, the apparatus further includes means for warning if the first or second switching means is in a malfunction state.

DETAILED DESCRIPTION OF THE PREFERRED EMBODIMENTS

With reference to the drawings, preferred embodiments according to the present invention will be described hereinafter.

(I) FIRST EMBODIMENT

Figure 1:
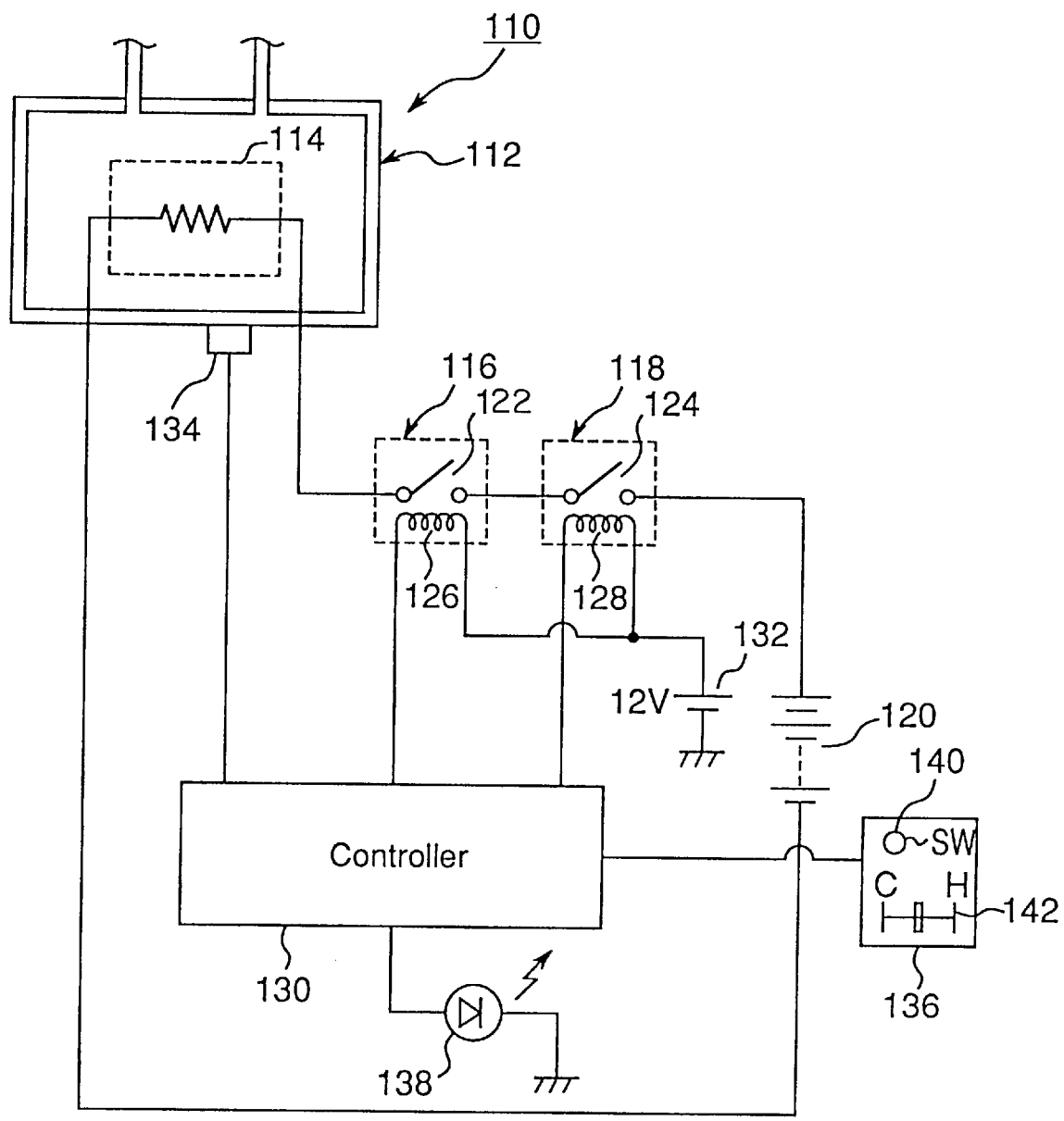
FIG. 1 is a circuit diagram of a hot-water heating system of an automotive air-conditioner according to the present invention.

FIG. 1 shows in part a construction of an automotive air-conditioner having a hot-water heating system. The hot-water heating system 110 Includes a heat unit 112 in which a heater 114 is mounted for heating a heat transporting medium, e.g., water. The heater 114 is serially connected through a first relay 116 and a second relay 118 with a DC power supply 120. The first relay 116, i.e., temperature control relay, is used for controlling the heater 114 and, thereby, adjusting a temperature of the heated water. The second relay 118, i.e., overheat-protection relay, is used for controlling the heater 114 and, thereby, preventing the heater 114 from, overheating. The first and second relays, 116 and 118, as known in the art, have contacts, 122 and 124, and coils, 126 and 128, respectively. The contacts, 122 and 124, constitute in part the electric circuit connecting the heater 114 and the power supply 120. The coils, 126 and 128, on the other hand, are connected in a parallel fashion between a controller 130 and a DC power supply 132.

The controller 130 is further connected with a sensor 134 for sensing a temperature of the heated water running through the heat unit 112, a plurality of inputs arranged on an operation panel 136 and a light emitting diode 138, preferably mounted on the panel 136, for warning the driver of the overheat of the heat unit 112. The inputs includes, among others, a heat switch 140 for energizing the hot-water heating system 110 and a volume switch 142 for designating or setting a air-conditioned temperature in the interior.

Figure 7:
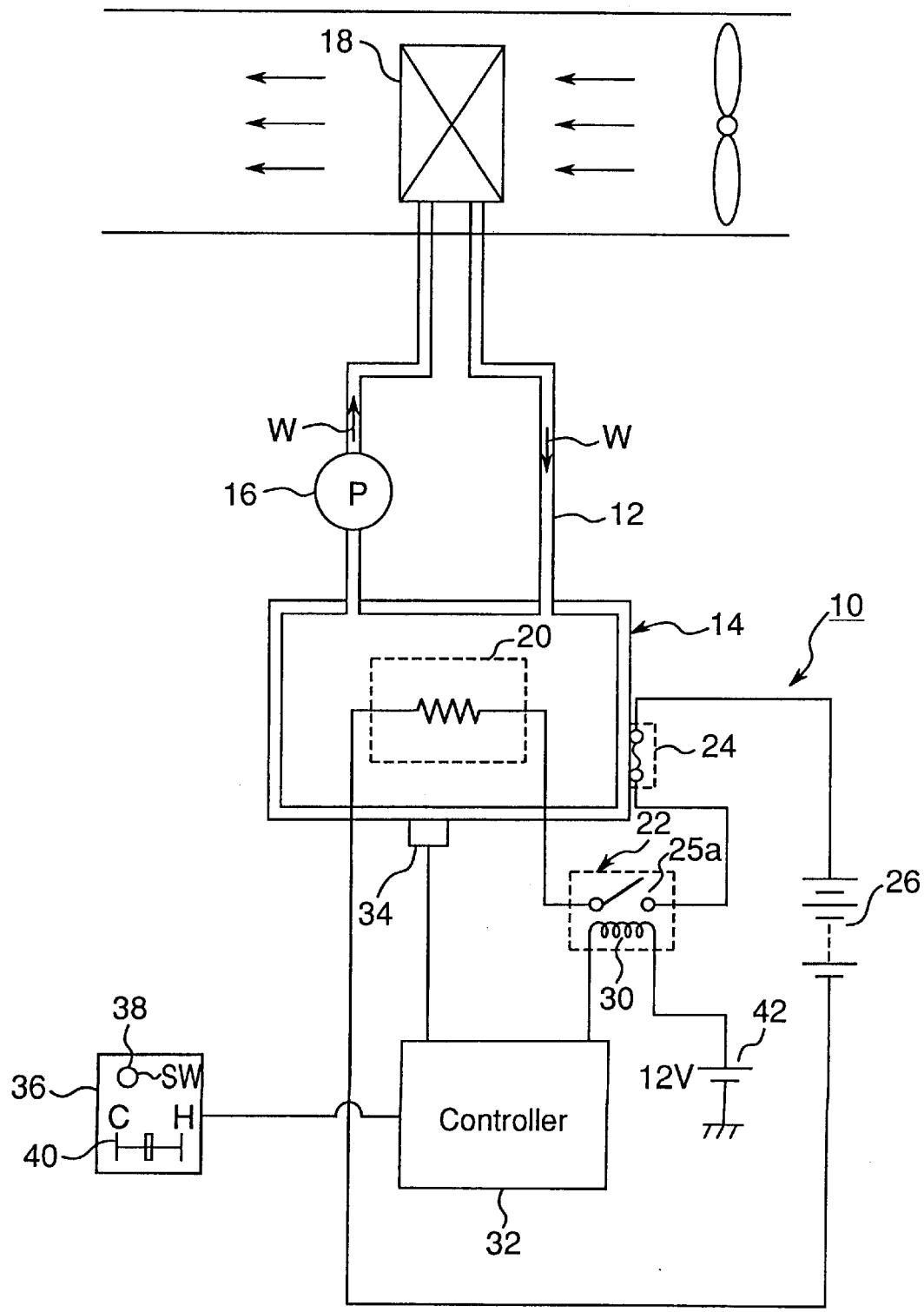
FIG. 7 is a circuit diagram of a prior art hot-water heating system of an automotive air-conditioner.

Although eliminated from the drawing for its clarification, similar to the prior art hot-water heating system shown in FIG. 7, the hot-water heating system 110 further includes a closed passage, a circulation pump, and an heat exchanger, so that the heat transporting medium or water is circulated by the circulation pump in the closed passage and, during circulation, it is heated at the heater unit 112 and then heat-exchanged at the heat-exchanger with air to be fed into the interior.

With the air-conditioner so constructed, the heater 114 is heated when it is supplied with the electric power through relays 116 and 118 from the DC power source 120, thereby heating the water. The heated water is then transported to the heat exchanger where it is used for heating air to be fed into the interior. The air-conditioning temperature (i.e., set temperature) in the interior is set or designated through the temperature control switch 142 on the panel 136. The set temperature is transmitted to the controller 130. Based upon the set temperature, the controller 130 determines a temperature of water to be controlled, i.e., objective temperature. In addition, the controller 130 reads the actual water temperature detected by the sensor 134. Based on the objective and detected temperatures, the controller 130 switches on and off the electric supply to the first relay 116 and, thereby, controls the voltage supply to the heater 114 from the DC power source 120 so as to adjust the water temperature to the objective temperature.

Figure 2:
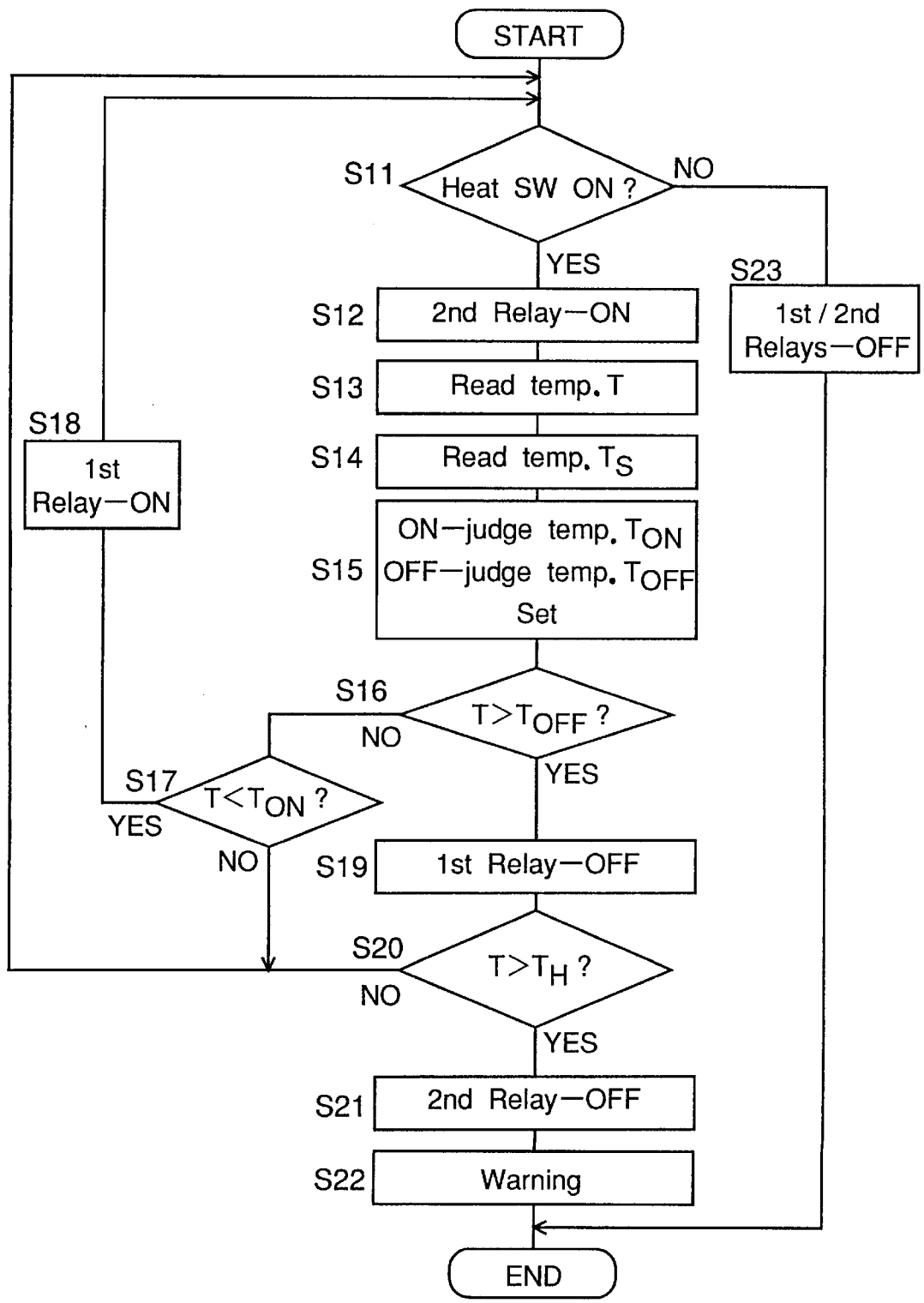
FIG. 2 is a program flowchart of a heat control for the hot-water heating system in FIG. 1.

Referring to a program flow shown in FIG. 2, a temperature control of the water will be described below. The temperature control is energized when the associated heat switch 140 on the panel 136 is switched on. In the temperature control, it is determined at step 11 whether the heat switch 140 on the operation panel 136 has been turned on. While the heat switch 140 is turned off, the first and second relays 116 and 118 are switched off at step 23 and, as a result, no heat control is executed.

Once the heat switch 140 is turned on, the second relay 26 is switched on at step 12 and, then, the temperature T of the water is read from the output of the sensor 134 at step 13. Next, at step 14, the set temperature $T_S$ set by the temperature control switch 136 is read. Then, based on the set temperature $T_S$, at step 15, an on-judge temperature $T_{ON}$ which is a threshold temperature for energizing the heater 114 and an off-judge temperature $T_{OFF}$ that is another threshold temperature for de-energizing the heater 114 are calculated.

Subsequently, another determination is made at step 16 whether the water temperature T detected by the sensor 134 is greater than the off-judge temperature $T_{OFF}$. As a result of the determination, if the water temperature T is less than the off-judge temperature $T_{OFF}$, another determination is made at step 17 whether the water temperature T is less than on-judge temperature $T_{ON}$. When the water temperature T is less than the on-judge temperature $T_{ON}$, the first relay 116 is turned on at step 18. This allows the power source 120 to supply the electric power through first and second relays 116 and 118 to the heater 114. Finally, the program returns to step 11. In contrary, if it is determined at step 17 that the water temperature T is more than $T_{ON}$, the program returns directly to step 11.

If it is determined at step 16 that the water temperature T is greater than off-judge temperature $T_{OFF}$, the first relay 116 is turned off at step 19 to complete the heating of the water. Then, another determination is made at step 20 whether the water temperature T is greater than another threshold temperature, i.e., overheat-judge temperature $T_H$, i.e., whether the water is overheated.

The overheat-judge temperature $T_H$ is a fixed value that is independent of the set temperature $T_S$ set at the operation panel 136. For example, in the first embodiment, if the objective temperature determined from the set temperature ranges from 40 to 80° C., the overheat-judge temperature $T_H$ is set to be 100° C.

Alternatively, the overheat-judge temperature $T_H$ may be varied in accordance with the set temperature. In this instance, the overheat-judge temperature $T_H$ may be set that it is greater by a predetermined temperature than the objective temperature. For example, if the predetermined temperature is 20° C. and the objective temperature is 40° C., the overheat-temperature $T_H$ is set to 60° C. In this case, before the water is over-heated up to a high temperature, e.g., 100° C., the overheating can be detected from the difference between the actual water temperature T and the objective temperature.

As a result of the determination at step 20, if the water temperature T is less than the overheat-judge temperature $T_H$, the program returns to step 11. In contrary to this, if the water temperature T is greater than the overheat-judge temperature $T_H$, the second relay 26 to prevent overheating is turned off at step 21, thereby switching off the heater 114. Then, the light emitting diode 138 is turned on at step 22 to warn the driver of the overheating and, then, the program completes.

Although the light emitting diode is employed for warning the driver of the overheating, it may be replaced with another light emitting means such as lamp, an alarm or a visual display.

Figure 3:
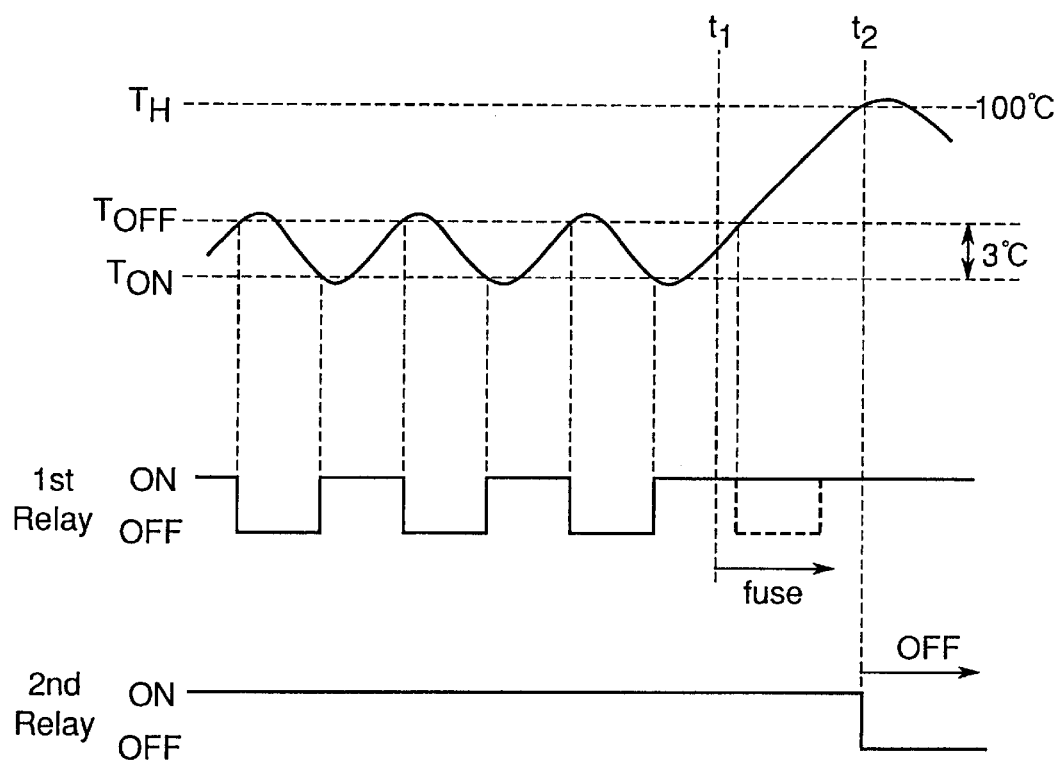
FIG. 3 is a graph showing a variation of a water temperature with passage of time in the hot-water heating system of FIG. 1 controlled by the heat control shown in FIG. 2.

FIG. 3 shows a variation of the water temperature with the passage of time in the hot-water heating system, the water temperature being controlled by the above-described temperature control. With the temperature control, the overheat-judge temperature $T_H$ is set to 100° C. and the difference between the on-judge temperature $T_{ON}$ and off-judge temperature $T_{OFF}$ is set to 3° C. As can be seen from the drawing, in the normal state, the water temperature is controlled within a certain range by the on/off operation of the first relay 116.

Once the contact 122 of the first relay 116 is fused to close the circuit having the relay at time t1, the temperature is uncontrollable by the relay 116. Therefore, when the water temperature is increased up to the overheat-judge temperature $T_H$ (e.g., 100° C.), the controller 130 turns off the second relay 118. This prohibits the further electric supply to the heater 114.

As described above, in the temperature control based on the set temperature $T_S$ designated at the operation panel 136, if the contact in the first relay 116 is fused to lead a short-circuit of the circuit having the relay, the voltage supply to the heater 114 is discontinued and, then, the second relay 26 for overheat protection is turned off. This allows the heater 114 to be safely disconnected from the power supply 120, thereby preventing the heater 114 from overheating. Also, the driver can take next necessary actions immediately after he or she is warned of the overheating.

(II) SECOND EMBODIMENT

A second embodiment of the automotive air-conditioner will be described below. The mechanical construction of the air-conditioner of the second embodiment is similar to that of the first embodiment with an exception that the first and second relays 116 and 118 are used both for controlling the water temperature and for preventing the overheating in the second embodiment while only the first relay 116 is used for temperature controlling in the first embodiment. For example, two relays 116 and 118 are switched on and off in the temperature control in the second embodiment and, therefore, a duration of the relay 116 can be extended compared with the first embodiment in which only one relay 116 is switched on and off for temperature controlling.

Figure 4:
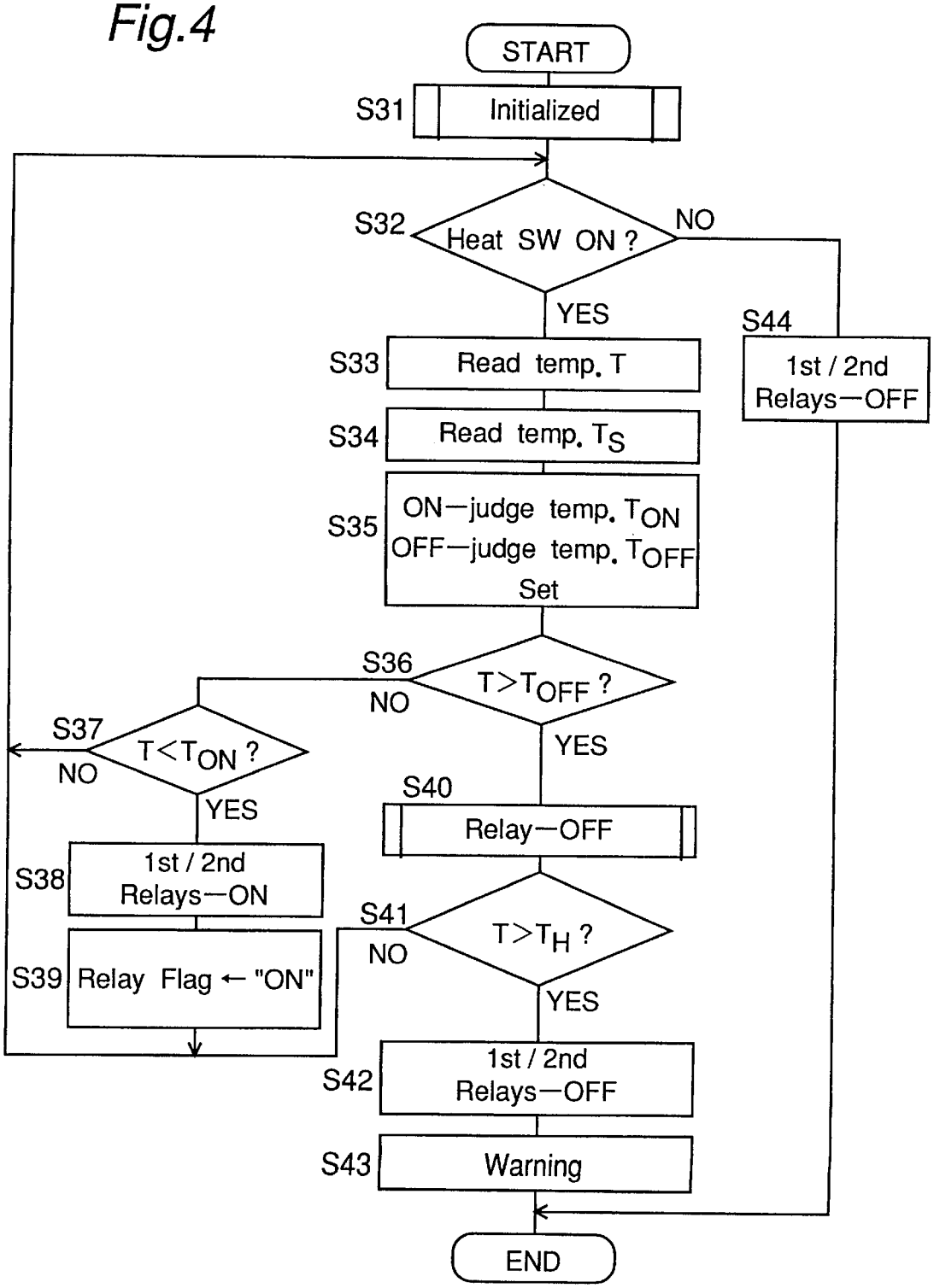
FIG. 4 is another program flowchart of a heat control of the second embodiment for the hot-water heating.

Specifically, referring to a program flowchart of FIG. 4, an operation of the controller 130 in second embodiment will be described below. Similar to the first embodiment, the operation is energized when the driver switches on the heat switch 140.

In this temperature control, a relay counter and a relay flag used in the following processes are initialized at first at step 31. For example, the relay counter is set to either "1" or "2". The relay counter "1" means that the relay that will be next turned off is the first relay 116 and the relay counter "2" means that the relay that will be next turned off is the second relay 26. The relay flag, on the other hand, is set to either "on" or "off". The relay flag "on" means that both relays 116 and 118 are turned on and the relay flag "off" means that the relay 116 or relay 118, or both relays are turned off. In the initializing step 31, the relay counter is set to "1" and the relay flag is set to "off".

Next to the initializing step 31, a determination is made at step 31 whether the heat switch 140 on the operation panel 136 is turned on. If the switch 140 is turned off, both first and second relays 116 and 118 are turned off at step 44 to complete the temperature control. If the heat switch 140 is turned on, the water temperature T and set temperature $T_S$ are read at steps 33 and 34, respectively. Then, based on the set temperature $T_S$, an on-judge temperature $T_{ON}$ and an off-judge temperature $T_{OFF}$ are set at step 35.

Next, a determination is made at step 36 whether the water temperature T is greater than the off-judge temperature $T_{OFF}$. If the water temperature T is less than the off-judge temperature $T_{OFF}$, a further determination is made at step 37 whether the water temperature T is less than the on-judge temperature $T_{ON}$. If the water temperature is less than the on-judge temperature $T_{ON}$, it is necessary to increase the temperature of the water and, therefore, the first and second relays 116 and 118 are turned on at step 38 and the relay flag is set to "on", and the program returns to step 32. If it is determined at step that the water temperature T is less than on-judge temperature $T_{ON}$, the program returns to step 32.

When it is determined at step 36 that the water temperature T is greater than the off-judge temperature $T_{OFF}$, it is necessary to complete the heating of the water and, therefore, a relay-off process is performed at step 40 in which process either first or second relay, 116 or 26, is turned off. The relay-off process will be described in detail afterwards.

Next, it is determined at step 41 whether the water temperature T is greater than the overheat-judge temperature $T_H$. If the water temperature T is overheat temperature $T_H$, the program returns to step 32. If, on the other hand, the water temperature T is greater than the overheat-judge temperature $T_H$, both relays 116 and 118 are turned off at step 42 to prevent the overheating and, then, the heater 114 is disconnected with the power source. Subsequently, to warn the driver of the overheating, the light emitting diode 138 is turned on and, then, the program completes.

Figure 5:
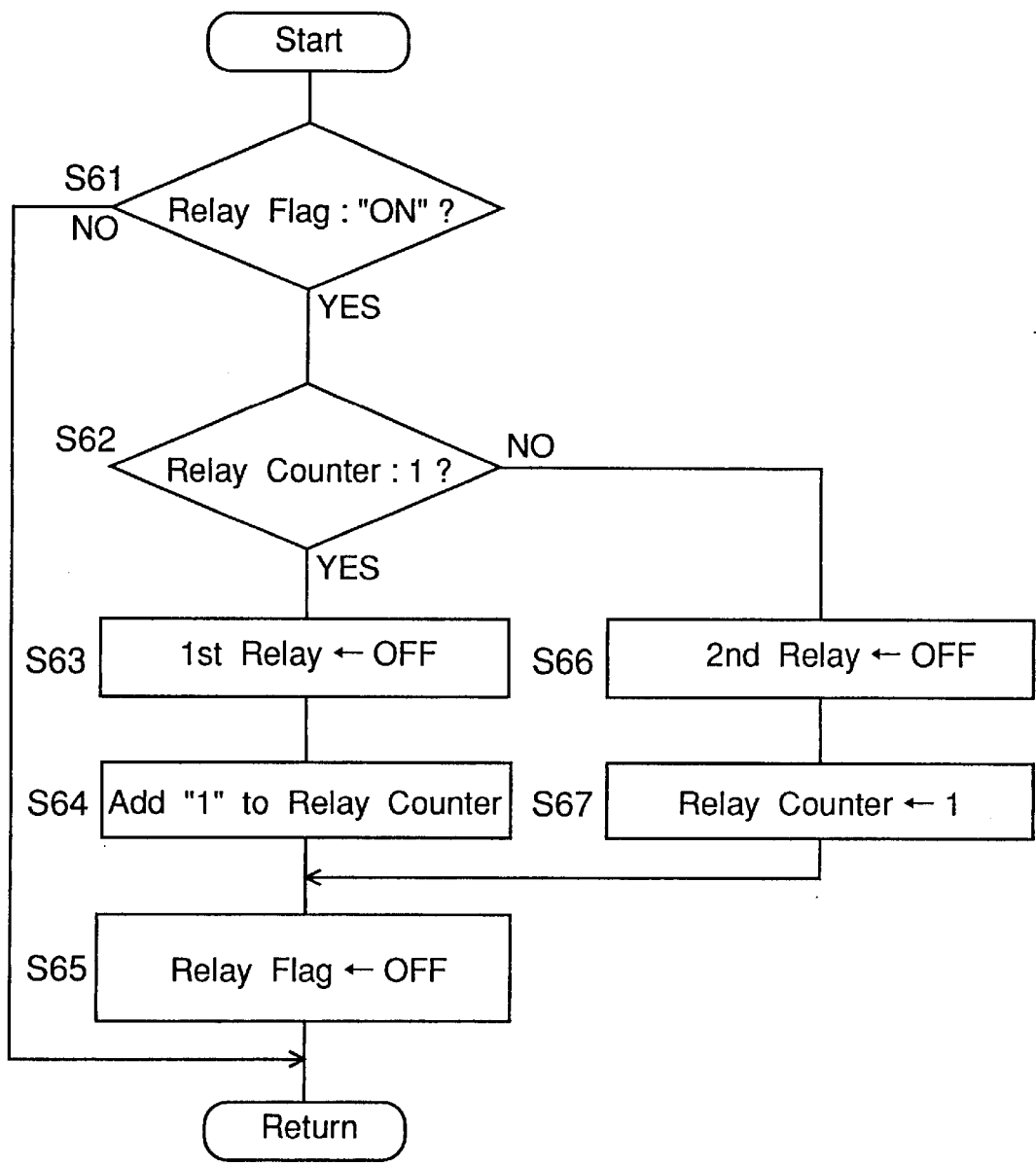
FIG. 5 is a program flowchart of a relay-off process in the flowchart shown in FIG. 4.

The relay-off process at step 40 will be described in detail with reference to a flowchart of FIG. 5. First, it is determined at step 61 whether the relay flag is "on". If the relay flag is "off", this means that the first and/or second relay is turned off and, therefore, the program returns to the main routine shown in FIG. 4. If the relay flag is "on", a further determination is made at step 62 whether the relay counter is "1".

When the relay counter is "1", the first relay 116 is turned off at step 63 and, then, the relay counter is changed to "2". Then, the program proceeds to step 65. If the relay counter is "2", the second relay 118 is turned off at step 66, the relay counter is reset to "1" at step 67 and the program proceeds to step 65. At step 65, the relay flag is set to "off" and, the program returns to the main routine.

Figure 6:
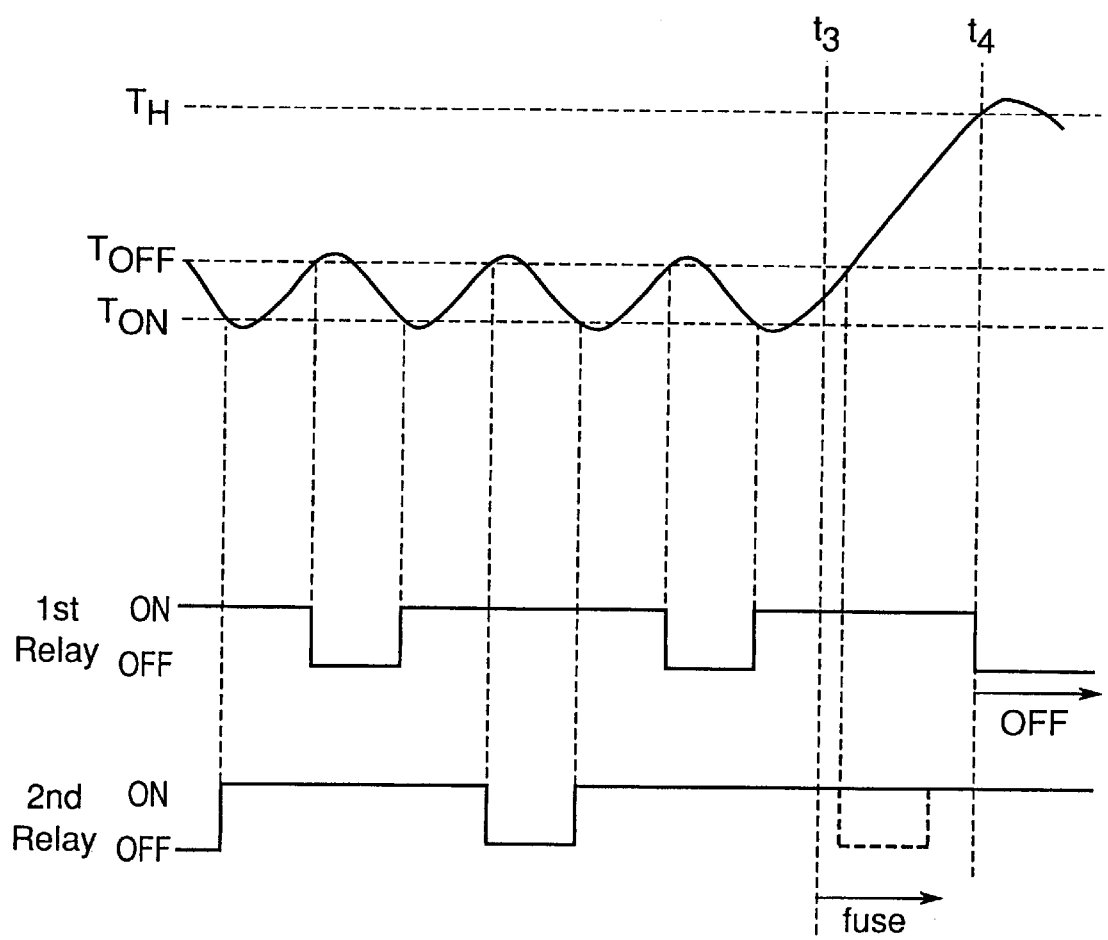
FIG. 6 is a graph showing a variation of a water temperature with passage of time in the hot-water heating system controlled by the second embodiment.

FIG. 6 graphs a variation of the water temperature with passage of time in the hot-water heating system, the water temperature being controlled by the above-described temperature control. The graph shows that, at time t3, the contact 124 of the second relay 118 is fused to close the circuit having the relay. This results in that the water temperature is out of control and, thereby, the water temperature will be increased. When the water temperature is increased up to the overheat-judge temperature $T_H$ at time t4, the controller 130 operates to turn off the first and second relays 116 and 118. Actually, at this time, the relay 118 has already been broken down due to the contact fusing and, therefore, only the first relay 116 is turned off. This results in that the heater 114 is disconnected.

As described above, in the second embodiment in which the first and second relays, 116 and 118, are alternately turned off for controlling the water temperature, even if one relay falls into a malfunction state such as fusing of the contact, the remaining relay 18 is turned off, which ensures that no further electric power is supplied to the heater 114. This also prevents further overheating by the heater.

Although in the second embodiment, the relays 116 and 118 are alternately switched off in the temperature control, it can be designed that the first relay is turned off a plurality of times and then the second relay is turned off once, for example. This can be done simply by letting the relay counter take three or more number.

Also, although the relay is used for switching the electric power to the heater, another switching elements, such as transistor and MOSFET, can be used instead.

In conclusion, as can be seen from above descriptions, according to the first embodiment of the present invention, when the first switching means (first relay) has fallen into a malfunction state due to the contact fusing, for example, and thereby the temperature of the water has increased to lead an overheated state, the second switching means (second relay) disconnects the heater from the power supply.

Also, according to the second embodiment of the present invention, any one of the first and second switching means has fallen into a malfunction state and thereby the temperature of the water has increased to lead an overheated state, the first and second switching means are designed to disconnect the heater from the power supply. Therefore, for example, even when the contact of the first switching means is fused to close the circuit having the switching means, the remaining switching means is set to disconnect the heater from the power source.

Further, reference temperatures (i.e., on-judge and off-judge temperatures) are determined from a control temperature obtained from the set temperature. Therefore, even when the set temperature is relatively low, the overheating will be detected, reliably disconnecting between the heater and the power source.

Furthermore, by the warning means (e.g., LED), the overheating will be warned to the driver.

As various changes could be made in the above construction, it is intended all matter contained in the above description or shown in the accompanying drawings shall be interpreted as illustrative and not in a limiting sense.

What is claimed is:

1. An automotive air-conditioner having a hot-water heating system, the heating system including a closed passage for circulating water, circulation means for circulating the water, heating means for heating the water and heat exchanging means for exchanging heat between the water and air to be fed into an interior of an automobile, comprising:

(a) means for setting an air-conditioning temperature;
(b) means for detecting a temperature of the heated water;
(c) a power supply for supplying an electric power to the heating means;
(d) a first switching means for controlling an electric supply from the power supply to the heating means;
(e) a second switching means associated with said first means for controlling the electric supply from the power supply to the heating means;
(f) a controller designed so as to control the first switching means in response to the set temperature and the detected temperature to adjust the temperature of the water to a certain control temperature determined by the set temperature, and to discontinue the electric supply to the heater by switching off the second switching means when the water temperature is greater than a reference temperature.

2. An apparatus according to claim 1, wherein the reference temperature is greater by a predetermined temperature than the certain control temperature.

3. An apparatus according to claim 1, further comprising means for warning if the first or second switching means is in a malfunction state.

4. An apparatus according to claim 2, further comprising means for warning if the first or second switching means is in a malfunction state.

5. An automotive air-conditioner having a hot-water heating system, the heating system including a closed passage for circulating water, circulation means for circulating the water, heating means for heating the water and heat exchanging means for exchanging heat between the water and air to be fed into an interior of an automobile, comprising:

(a) means for setting an air-conditioning temperature;
(b) means for detecting a temperature of the heated water;
(c) a power supply for supplying an electric power to said heating means;
(d) a first switching means for controlling an electric supply from the power supply to the heating means;
(e) a second switching means for controlling the electric supply from the power supply to the heating means;
(f) a controller designed so as to control the first switching means and the second switching means in response to the set temperature and the detected temperature to adjust the temperature of the water to a certain control temperature determined by the set temperature, and to discontinue the electric supply to the heater by switching off the first and second switching means when the water temperature is greater than a reference temperature.

6. An apparatus according to claim 1, wherein the reference temperature is greater by a predetermined temperature than the certain control temperature.

7. An apparatus according to claim 1, further comprising means for warning if the first or second switching means is in a malfunction state.

8. An apparatus according to claim 2, further comprising means for warning if the first or second switching means is in a malfunction state.

* * * * *